J. S. ROYS.
Wheeled-Hoes.
No. 146,712.
Patented Jan. 20, 1874.
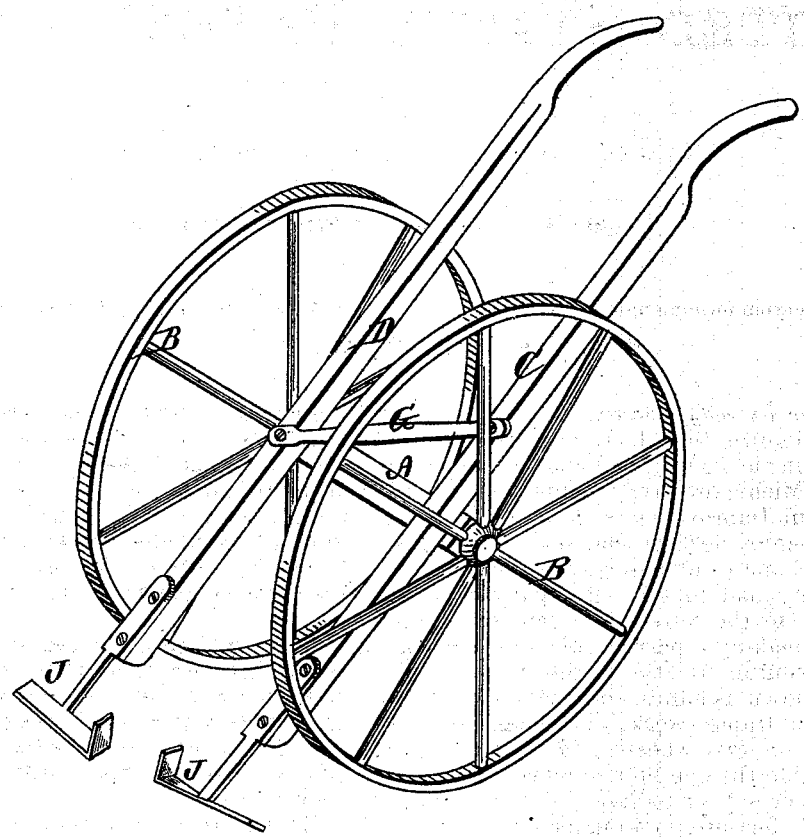
WITNESSES.
INVENTOR
By
Attorneys.

UNITED STATES PATENT OFFICE.

JAMES SIDNEY ROYS, OF HUDSON, MICHIGAN.

IMPROVEMENT IN WHEELED HOES.

Specification forming part of Letters Patent No. 146,712, dated January 20, 1874; application filed October 3, 1873.

*To all whom it may concern:*

Be it known that I, J. SIDNEY ROYS, of Hudson, in the county of Lenawee and in the State of Michigan, have invented certain new and useful Improvements in Wheeled Hoes; and do hereby declare that the following is a full, clear, and exact description thereof, reference being had to the accompanying drawings and to the letters of reference marked thereon, making a part of this specification.

My invention relates to the class of cultivators known as hand-cultivators; and it consists in a frame-work, with hoes attached, mounted on two wheels, and so constructed as to enable the operator to move the hoes to the right or left, or to give the hoes a side as well as a forward motion, as will be hereinafter more fully set forth.

In order to enable others skilled in the art to which my invention appertains to make and use the same, I will now proceed to describe its construction and operation, referring to the annexed drawing, which represents a perspective view of my implement.

A represents an axle of suitable length with a wheel, B, on each end. C and D represent two bars or handles placed on top across the axle A, and fastened to the same, each with a single screw or bolt. G represents a brace connecting the handle C with the bolt that fastens the handle D to the axle, thus making the handle C rigid to the axle, while the handle D can turn on its bolt as on a pivot. To the front ends of the bars or handles C D are attached hoes J J, the inner ends of which are turned upward, as shown. The operator guides this implement with the rigid handle C, and by turning the handle D on its pivot the distance between the hoes is readily adjusted.

This implement or wheeled hoe may be run either between or astride whatever it is desired to hoe or cultivate, and not only destroys the weeds which are between the rows, but will also remove weeds from the row. It is simple in construction, easily worked, and efficient in operation.

Having thus fully described my invention, what I claim as new, and desire to secure by Letters Patent, is—

The combination of the axle A, wheels B B, stationary handle C, pivoted handle D, and hoes J J, all constructed and arranged substantially as and for the purposes herein set forth.

In testimony that I claim the foregoing I have hereunto set my hand this 16th day of September, 1873.

JAMES SIDNEY ROYS.

Witnesses:
 THOMAS J. HALLER,
 BYRON H. SAVAGE.